US008872641B2

(12) United States Patent
Sowa et al.

(10) Patent No.: US 8,872,641 B2
(45) Date of Patent: Oct. 28, 2014

(54) PREMISES-BASED WIRELESS ALERT SYSTEM FOR AUTOMOTIVE TALL CARGO

(75) Inventors: Karl Sowa, Denver, CO (US); Tom Rieber, Denver, CO (US)

(73) Assignee: Headup Systems, Denver, CO (US)

( * ) Notice: Subject to any disclaimer, the term of this patent is extended or adjusted under 35 U.S.C. 154(b) by 196 days.

(21) Appl. No.: 13/481,116

(22) Filed: May 25, 2012

(65) Prior Publication Data

US 2012/0299712 A1 Nov. 29, 2012

Related U.S. Application Data

(60) Provisional application No. 61/490,651, filed on May 27, 2011.

(51) Int. Cl.
*B60Q 1/00* (2006.01)
*G08G 1/16* (2006.01)
*G08G 1/095* (2006.01)

(52) U.S. Cl.
CPC ................ *G08G 1/165* (2013.01); *G08G 1/095* (2013.01)
USPC ........ 340/435; 340/436; 340/431; 340/425.5; 701/301

(58) Field of Classification Search
CPC ................ G01S 13/931; G01S 17/936; G01S 2013/9382; G01C 5/00
USPC ................ 340/435, 436, 431, 425.5; 701/301
See application file for complete search history.

(56) References Cited

U.S. PATENT DOCUMENTS

| | | | | |
|---|---|---|---|---|
| 5,710,553 | A * | 1/1998 | Soares | 340/903 |
| 5,945,907 | A * | 8/1999 | Yaron et al. | 340/436 |
| 6,166,660 | A * | 12/2000 | Grenier | 340/932.2 |
| 6,737,960 | B2 | 5/2004 | Preston | |
| 7,391,311 | B2 | 6/2008 | Haskew | |
| 7,688,187 | B2 | 3/2010 | Caird et al. | |
| 2003/0141966 | A1* | 7/2003 | Strumolo et al. | 340/435 |
| 2004/0183661 | A1 | 9/2004 | Bowman | |
| 2007/0103282 | A1* | 5/2007 | Caird et al. | 340/435 |
| 2007/0164854 | A1 | 7/2007 | Hill | |
| 2007/0273490 | A1 | 11/2007 | Fuchs et al. | |
| 2008/0077327 | A1 | 3/2008 | Harris et al. | |

* cited by examiner

*Primary Examiner* — Steven Lim
*Assistant Examiner* — Hongmin Fan
(74) *Attorney, Agent, or Firm* — Neugeboren O'Dowd PC

(57) ABSTRACT

This disclosure describes systems, methods, and apparatuses for providing visual and audio warnings to a vehicle driver warning of cargo on the vehicle roof when the vehicle approaches a structure. A low-power wireless transmitter can be coupled to each cargo item and is small enough to be left on the cargo when the cargo is used such that the wireless transmitter need not be removed from and reattached to the cargo. The wireless transmitter emits a wireless signal that a visual warning device coupled to the structure detects along with detection of a wireless signal from an audio warning device mounted within the vehicle. When both signals are detected, the visual warning device can provide a visual warning to the driver and also instruct the audio warning device inside the vehicle to audibly warn the driver.

17 Claims, 10 Drawing Sheets

PREMISES-BASED WIRELESS ALERT SYSTEM FOR AUTOMOTIVE TALL CARGO

PRIORITY AND RELATED APPLICATIONS

This application claims priority to U.S. Patent Application No. 61/490,651 filed on May 27, 2011. The details of U.S. Patent Application No. 61/490,651 are incorporated herein by reference in its entirety and for all proper purposes.

FIELD OF THE INVENTION

The present invention relates generally to vehicle warning systems. In particular, but not by way of limitation, the present invention relates to systems, methods and apparatuses for warning a driver of tall cargo that will not clear a structure or other obstable.

BACKGROUND OF THE INVENTION

Vehicle and cargo damage often occurs when drivers forget about or are unaware of the height of cargo on top of or carried behind their vehicle. Structures such as garage doors and garage roofs can also be damaged in these situations. Some solutions have included ultrasonic distance-detection devices permanently mounted to the vehicle and in-vehicle warning systems powered from connection to the vehicle's electric system.

SUMMARY

This disclosure describes systems, methods, and apparatuses for wirelessly detecting a potential collision between a vehicle or vehicle-mounted cargo and a structure with insufficient clearance for the vehicle or cargo, and warning a driver of the potential collision via one or more visual and/or audio warnings.

In one aspect, the disclosure describes a wireless vehicle warning system comprising a wireless transmitter, an audio warning device, and a visual warning device. The wireless transmitter can be fixed to a cargo item. The audio warning device can be coupled to the vehicle and configured to provide an audio warning to at least one occupant of the vehicle when a notification is received. The visual warning device, that upon detecting a presence of the wireless transmitter, can be configured to: (1) provide a first visual warning to the vehicle; and (2) provide the notification to the audio warning device.

In another aspect, the disclosure discusses a method of preventing damage to a vehicle or its cargo. The method can include providing an audio warning device coupled to the vehicle. The method can further include providing a visual warning device. The method can also include transmitting a first wireless signal from the audio warning device to the visual warning device. Additionally the method can include initiating a visual warning sequence in the visual warning device and an audio warning sequence in the audio warning device when the visual warning device detects the first wireless signal.

In another aspect, the disclosure describes a wireless vehicle warning system comprising an audio warning device visual warning device. The audio warning device can be coupled to the vehicle and configured to provide an audio warning to at least one occupant of the vehicle when a notification is received. The visual warning device can be remote from the vehicle. The visual warning device can, upon detecting a presence of the audio warning device, provide a visual warning to the vehicle, and provide the notification the audio warning device.

BRIEF DESCRIPTION OF THE DRAWINGS

Various objects and advantages and a more complete understanding of the present invention are apparent and more readily appreciated by referring to the following detailed description and to the appended claims when taken in conjunction with the accompanying drawings:

DETAILED DESCRIPTION

A number of systems provide warnings against cargo, car, and structural damage caused from drivers forgetting that cargo extends above the height of the vehicle. However, current solutions involve one or more of the following encumbrances: complex and costly modification to the vehicle's electrical system to power the warning system; warranty-invalidating vehicle modifications; and the need for the driver to remember to mount a device on the cargo every time cargo is put on top or behind the vehicle.

The present disclosure avoids these problems by using proximity-based wireless detection of small low-power transmitters affixed to each cargo item on the vehicle and one within the vehicle, where the transmitters are small enough to be permanently affixed to cargo without inhibiting normal off-vehicle use of the cargo. Furthermore, the small size, low-power, and distributed functionality of the transmitter, receiver, visual warning, and audio warning allow the vehicle and cargo-mounted devices to operate on batteries and thus avoid costly, cumbersome, and complex connections with the vehicle's electrical system.

Figure 1:
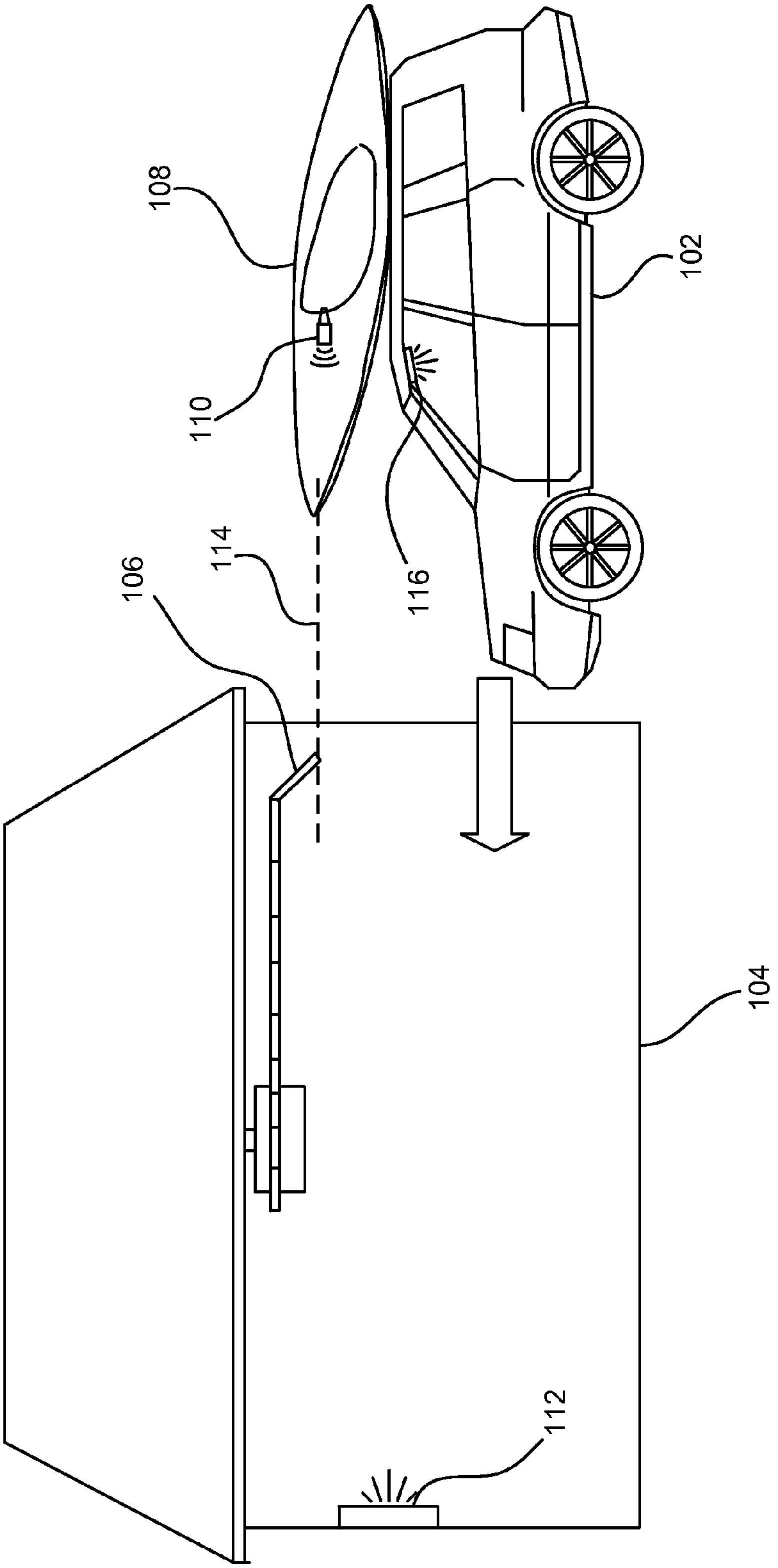
FIG. 1 illustrates a structure and vehicle incorporating a proximity-based wireless detection system as herein disclosed.

FIG. 1 illustrates a structure 104 and vehicle 102 incorporating a proximity-based wireless detection system as herein disclosed. The wireless detection system can include a visual warning device 112 that visually warns or reminds a driver of cargo 108 coupled to the vehicle 102 that may impact the structure 104 when the vehicle 102 enters the structure 104. Such a warning can be activated when a wireless transmitter 110 coupled to the cargo 108 and an audio warning device 116 coupled to (or within) the vehicle 102, are detected by the visual warning device 112. The audio warning device 116 can also activate an audio warning that further alerts the driver. The visual warning device 112 can also distinguish between different vehicles 102 and different cargo 108 based on the audio warning devices 116 coupled to each of a plurality of vehicles 102 and based on the wireless transmitters 110 coupled to each cargo item 108.

The structure 104 can include any of a variety of structures such as garages, airport jetways, bridges, tunnels, commercial parking structures, and others. The vehicle 102 can include cars, trucks, vans, semitrailers, motorcycles, and scooters to name just a few non-limiting examples. The structure 104 can have a door 106 or some other structural component that establishes a clearance 114. Portions of objects on the vehicle 102 that extend above the clearance 114 may strike the door 106 if the vehicle is allowed to move into or the structure 104. One or more pieces of cargo 108 can be coupled to the vehicle 102, including, but not limited to, sporting equipment, construction equipment, moving equipment, or any other objects that can be attached to and extend above a height of the vehicle 102. In the illustrated embodiment, the cargo 108 is a kayak. Cargo 108 can be coupled to a top of the vehicle 102, behind the vehicle 102, or to a trailer towed behind the vehicle 102. Fixed to each cargo item 108 can be a wireless transmitter 110. The wireless transmitter 110 emits an wireless signal that can be detected by the visual warning device 112 mounted on the structure 104.

In an embodiment, the visual warning device 112 provides a visual warning to the driver of the vehicle 102 when it detects the wireless transmitter 110. In another embodiment, the visual warning device 112 provides the visual warning to the driver when it detects both the wireless transmitter 110 and the audio warning device 116. Such an embodiment can help avoid false positives—where the wireless transmitter approaches the structure 104 without the vehicle 102 (e.g., riding a bike home). Detection can occur when the visual warning device 112 detects a first wireless signal from the wireless transmitter 110 and a second wireless signal transmitted from the audio warning device 116. Alternatively, detection can occur when the visual warning device 112 detects a threshold signal strength of the first wireless signal and a threshold signal strength of the second wireless signal.

In an embodiment, the visual warning device 112 monitors the presence of one or more wireless transmitters 110, for instance one coupled to a first bike, a second coupled to a second bike, and a third coupled to a kayak. The presence of a wireless transmitter 110 can be stored in a memory of the visual warning device 112 and indicates that the wireless transmitter 110 is in or near the structure 104. When one of the wireless transmitters 110 leaves the structure 104—the visual warning device 112 can no longer detect the wireless transmitter 110—the visual warning device 112 notes that the wireless transmitter 110 has left, for instance by removing a reference to the wireless transmitter 110 from the memory of the visual warning device 112. Once a wireless transmitter 110 has left the structure 104, the visual warning device 112 can recognize the return of the wireless transmitter 110. This way, the mere presence or detection of a wireless transmitter 110 will not initiate the visual warning device's visual warning sequence, but rather only the return, or new detection, of a wireless transmitter 110 will initiate the visual warning sequence. In an embodiment, the visual warning sequence is initiated only when a wireless transmitter 110 is detected and the wireless transmitter 110, or a reference to the wireless transmitter 110, was not in the memory of the visual warning device 112 prior to detection. In a further embodiment, the wireless transmitter 110, or reference to the wireless transmitter 110, is removed from memory after detection of the wireless transmitter 110 ends, and a threshold period of time has elapsed (e.g., 30 seconds). For instance, the wireless transmitter 110 may have to leave a detection range of the visual warning device 112 for at least 30 seconds, or else the visual warning device 112 will not initiate the visual warning sequence upon the wireless transmitter's 110 return to the structure 104.

The visual warning device 112 can also transmit a signal to the audio warning device 116 instructing the device 116 or activating an operation in the device 116 to provide an audio warning to the driver. Thus, in an embodiment, when the wireless transmitter 110 (and optionally the audio warning device 116) comes within a certain distance of the visual warning device 112, the visual warning device 112 can provide a visual warning to the driver and the audio warning device 116 can provide an audio warning to the driver.

Advantageously, the wireless transmitter 110 can be small enough to be permanently fixed to the cargo 108 such that the cargo 108 can be used without removing the wireless transmitter 110. Because of this, the wireless transmitter 110 need not be removed and fixed to the cargo 108 every time that the vehicle 102 is driven. Thus, there is no danger that a driver will forget to fix the wireless transmitter 110 to the cargo 108.

Additionally, the wireless transmitter 110 and audio warning device 116 use energy-efficient circuitry such that they can operate on batteries for long periods of time (e.g., a year or more) without the need to change batteries or be connected to the vehicle's 102 electrical system (e.g., via the fuse box or cigarette lighter). The low power usage of the wireless transmitter 110 is in part a consequence of the device merely being responsible for transmission, and leaving reception functionality to the visual warning device 112. In this way, the wireless transmitter 110 need not project and receive a signal as many ultrasonic and distance detectors in the art work (both being potentially more power hungry than the instant wireless transmitter 110).

Furthermore, while it is easy to position an audio device (e.g., audio warning device 116) inside a vehicle since it need not be in the driver's field of view, visual devices (e.g., visual warning device 112) have a more limited area where they can be placed. Moreover, they tend to inhibit the driver's view during driving. At the same time, audio waves attenuate much faster than visual waves, and thus audio devices can preferably be located closer to a driver than a visual device. Here, the visual device, visual warning device 112, can be located outside of the vehicle 102 and at a distance from the driver as he/she approaches, thus freeing the driver's view as compared to in-car visual warning devices, but still presenting the visual warning when needed—while entering the structure 104. At the same time, the audio device, audio warning device 116, can be located inside of the vehicle 102 where sound output need not be great, and can be located where it too will not impede the driver's view (e.g., clipped to the vehicle 102 visor). Distributing the transmission, audio warning, and visual warning functions between three different devices so that each function can be uniquely located, is one example of how the present disclosure represents an inspired departure from the art.

Figure 2:
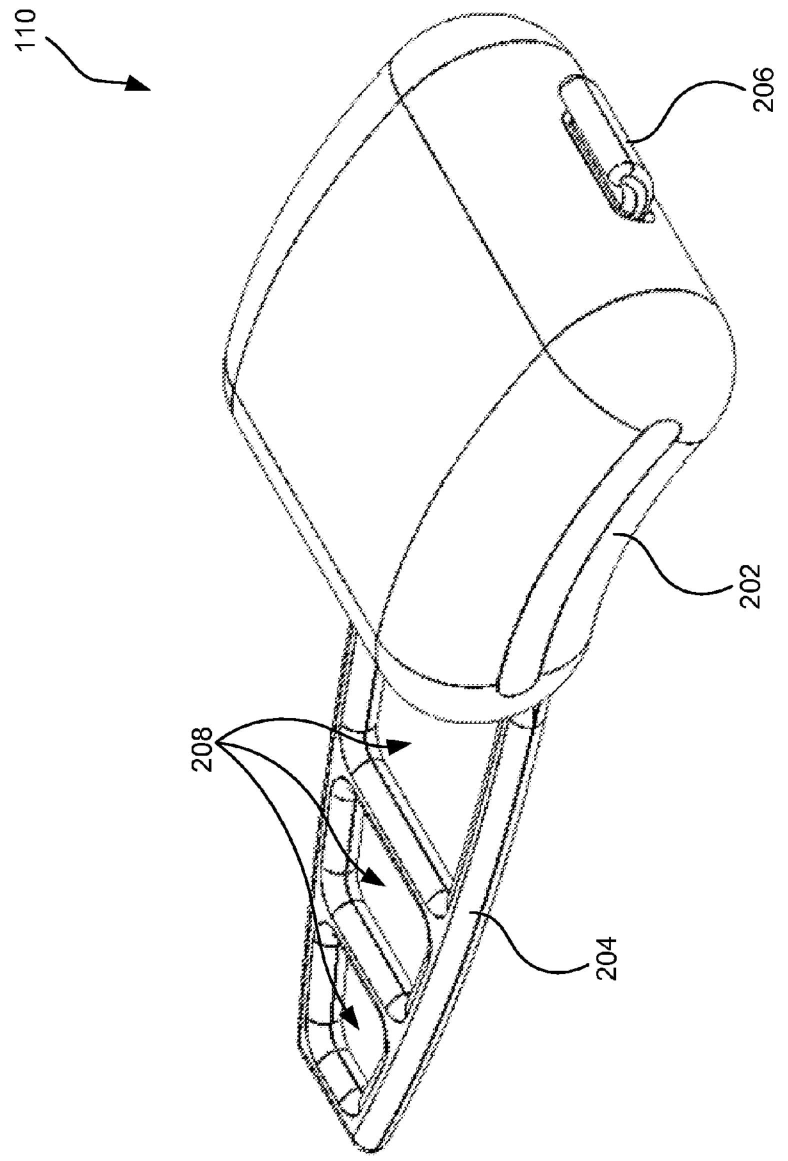
FIG. 2 illustrates an isometric view of an embodiment of a wireless transmitter 110.

FIG. 2 illustrates an isometric view of an embodiment of a wireless transmitter 110. The wireless transmitter 110 includes an electronics compartment 202 coupled to a coupling mechanism 204. The electronics compartment 202 can contain electronics for generating a wireless signal detectable by the visual warning device 112. The electronics compartment 202 can also contain one or more expendable or rechargeable batteries.

The electronics compartment 202 can be made from a flexible yet sturdy material able to compress or deform under impact and then return to its original shape in order to absorb dynamic impacts and forces (e.g., silicone, polymers, polyethylene, and polypropylene to name just a few non-limiting examples). This material can help protect circuits within the electronics compartment 202. The electronics compartment 202 can encase and protect the electronics and the battery via a water resistant seal. The material can be flexible such that the battery can be removed from the electronics compartment 202 via deformation of the material, while at the same time the material can return to its original shape in order to create a water resistant seal.

The coupling mechanism 204 can be a flexible and possibly elastic component that can wrap around a portion of the cargo 108 (e.g., a tube of a bike frame) and engage the tab 206 in order to hold the coupling mechanism 204 and fix the wireless transmitter 110 to the portion of the cargo 108. In the illustrated embodiment, the coupling mechanism 204 includes latching portions 208 that can engage with the tab 206 to hold the coupling mechanism 204 wrapped around a portion of the cargo 108. Different latching portions 208 can engage with the tab 206 in order to accommodate different sized portions of the cargo 108. The tab 206 can be curved in order to help remain engaged with the latching portions 208. The tab 206 can also be made from a material with a texture and/or coefficient of friction that enhances the coupling between the tab 206 and the coupling mechanism 204. The tab 206 can be made from a non-flexible polymer (e.g., plastic) and can be connected to an electronics housing within the electronics compartment 202.

The wireless transmitter 110 can be fixed to any portion of the cargo 108. There is no requirement that the wireless transmitter 110 be fixed to a front or top of the cargo 108. Rather, logic in the visual and audio warning devices 112, 116 can be programmed to account for the wireless transmitter 110 being located in various positions. For instance, where it is known that the wireless transmitter 110 will be fixed to vehicles 102 of up to fifteen feet in length, the visual and audio warning devices 112, 116 can be set to activate when the wireless transmitter 110 comes within a structure 104 length plus fifteen feet. Thus, no matter where the wireless transmitter 110 is located, and no matter how long the vehicle 102 is, the visual and audio warning devices 112, 116 will provide a warning before the cargo 108 reaches the structure 104. In other words, the visual warning device 112 software or logic can have a built-in distance or signal strength buffer that ensures that a warning is given no matter how long the vehicle 102 is and no matter where the wireless transmitter 110 is located in relation to the vehicle 102.

The wireless transmitter 110 can be sized to enclose the electronics and battery within the electronics compartment 202. In this way, the wireless transmitter 110 can be small enough to be fixed to the cargo 108 and left on the cargo 108 when the cargo 108 is used (e.g., while kayaking, biking, surfing, etc.).

The wireless signal sent by the wireless transmitter 110 to the visual warning device 112 can be, for instance but not by way of limitation, a radio frequency (RF) or infrared (IR) signal. The signal can be coded to distinguish it from background noise, for instance via a particular pulsing pattern, pulse width modulation, frequency, or any other wireless transmission protocol (e.g., Wi-Fi or Bluetooth to name just two non-limiting examples).

Figure 3:
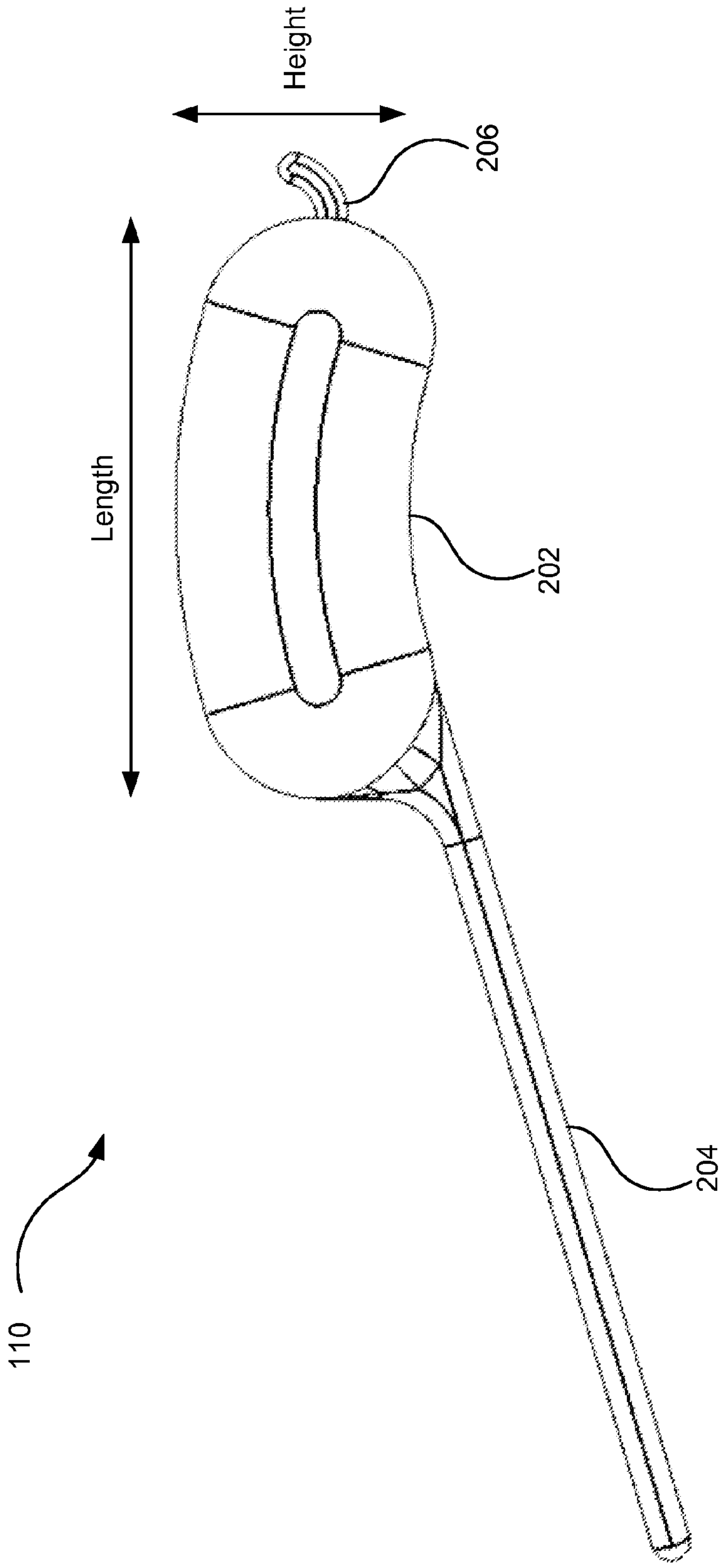
FIG. 3 illustrates a side view of the wireless transmitter illustrated in FIG. 2.

FIG. 3 illustrates a side view of the wireless transmitter 110 illustrated in FIG. 2. The electronics compartment 202 can have a curved profile such that one side is convex and another is concave. This may be preferred as the electronics compartment 202 can then fit more snuggly or flush to curved surfaces often seen on many types of cargo (e.g., bike frames, kayak frames and paddles, canoe siding, etc.). The electronics compartment 202 can have a low profile as illustrated that can make the electronics compartment 202 less noticeable and more aerodynamic when fixed to a cargo item 108. For purposes of this disclosure, low profile means that the height is less than the length and/or width. For instance, if fixed to a bike frame, the electronics compartment's 202 low profile will lead to less aerodynamic drag when fixed to a bike than a component with a height equal to or greater than the length (e.g., a tall profile). Additionally, the low profile makes it less likely that the electronics compartment 202 will be impacted by body parts, tree branches, rocks, or other things that could knock the electronics compartment 202 off of the cargo 108 during use. For instance, the low profile may make it less likely that rocks rubbing up against the side of a kayak will rip the wireless transmitter 110 from the kayak during river use.

Figure 4:
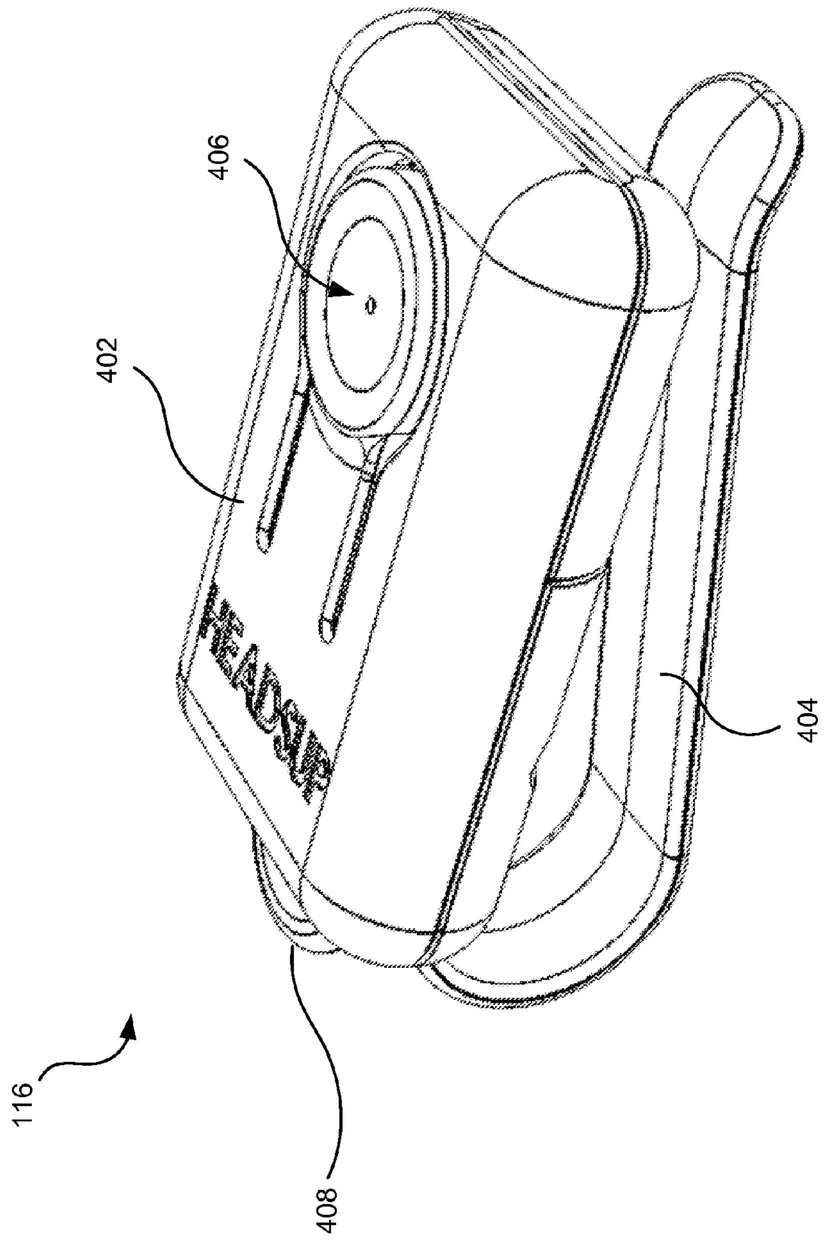
FIG. 4 illustrates an isometric view of an embodiment of an audio warning device.

FIG. 4 illustrates an isometric view of an embodiment of an audio warning device 116. The audio warning device 116 includes an electronics compartment 402 with a speaker 406, and a first coupling mechanism 404 coupled to the electronics compartment 402. The speaker 406 can produce an audio warning loud enough for a driver to hear even when the engine of the vehicle is running. There is also a second optional coupling mechanism 408 that can be attached to the electronics compartment 402.

The electronics compartment 402 can contain electronics for receiving a wireless signal from the visual warning device 112. Such electronics can include an antenna and processing circuitry for converting the wireless signal detected by the antenna into a digital signal that can be processed via control circuitry of the electronics compartment 402. The wireless signal sent from the visual warning device 112 of FIG. 1 can be, for instance but not by way of limitation, a radio frequency (RF) or infrared (IR) signal. The signal can be coded to distinguish it from background noise, for instance via a particular pulsing pattern, pulse width modulation, frequency, or some other signal characteristic. The electronics compartment 402 can also contain one or more expendable or rechargeable batteries such that the audio warning device 116 need not be connected to the vehicle's 102 electrical system. Alternatively, the audio warning device 116 can be powered via the vehicle's 102 cigarette lighter.

The first coupling mechanism 404 can be a clip or other flexible mechanism allowing the audio warning device 116 to be coupled to a portion of the inside of the vehicle 102. For instance, the first coupling mechanism 404 can be clipped to one of the vehicle's 102 visors just as many garage door openers are. Yet, a second optional coupling mechanism 408 can allow a tie, lanyard, string, or some other long flexible cord-type object to be looped through the second coupling mechanism 408 and used to couple the audio warning device 116 to the inside of the vehicle 102.

In an embodiment, one or more of the functions of the audio warning device 116 can be implemented in hardware, software, firmware, or a combination of the above. For instance, the audio warning device 116 can include circuits and software configured to identify the wireless signal from the visual warning indicator 112, convert the signal to a digital signal and analyze the digital signal, and generate one or more instruction signals to be provided to the speaker 406 or other circuitry, logic, or software in the audio warning device 116.

Figure 5:
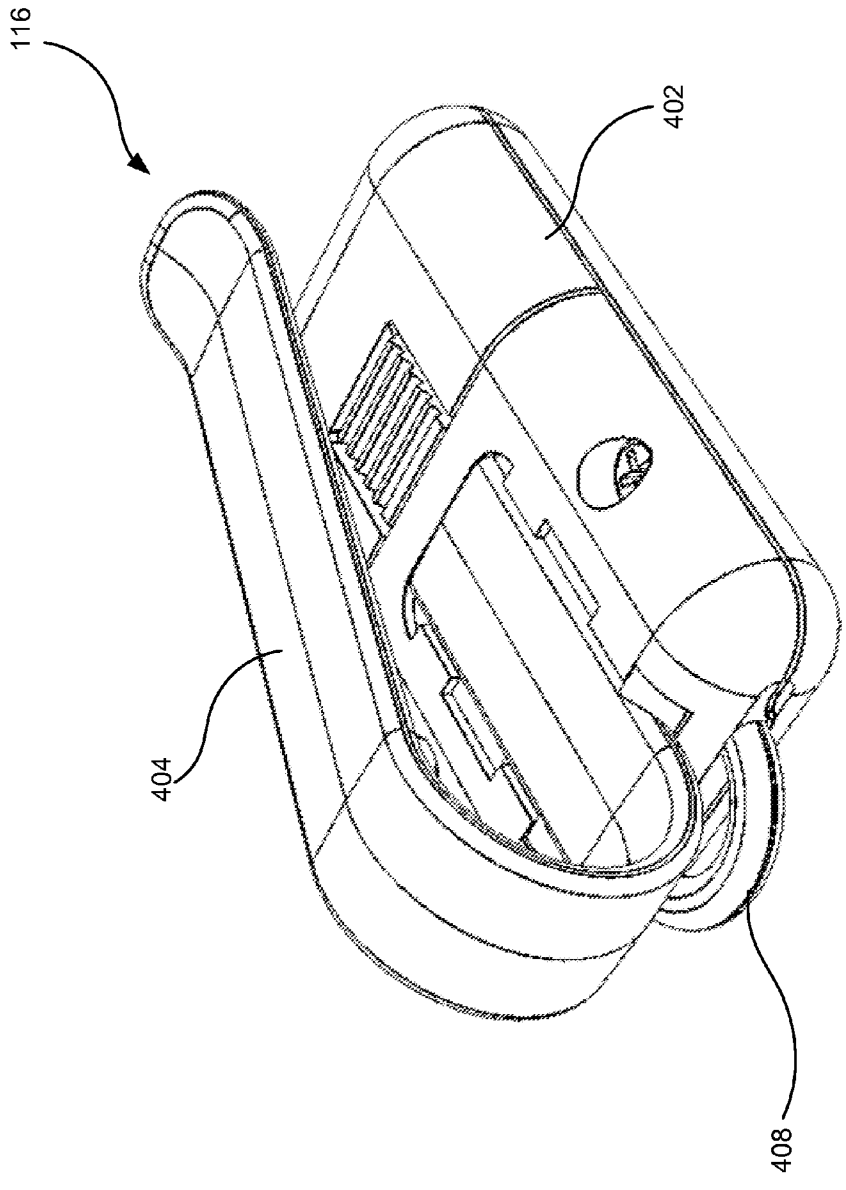
FIG. 5 illustrates another isometric view of the audio warning device illustrated in FIG. 4.

FIG. 5 illustrates another isometric view of the audio warning device 116 illustrated in FIG. 4. Again, the first coupling mechanism 404 is seen to be coupled to the electronics compartment 402, and the electronics compartment 402 is further coupled to a second coupling mechanism 408.

Figure 6:
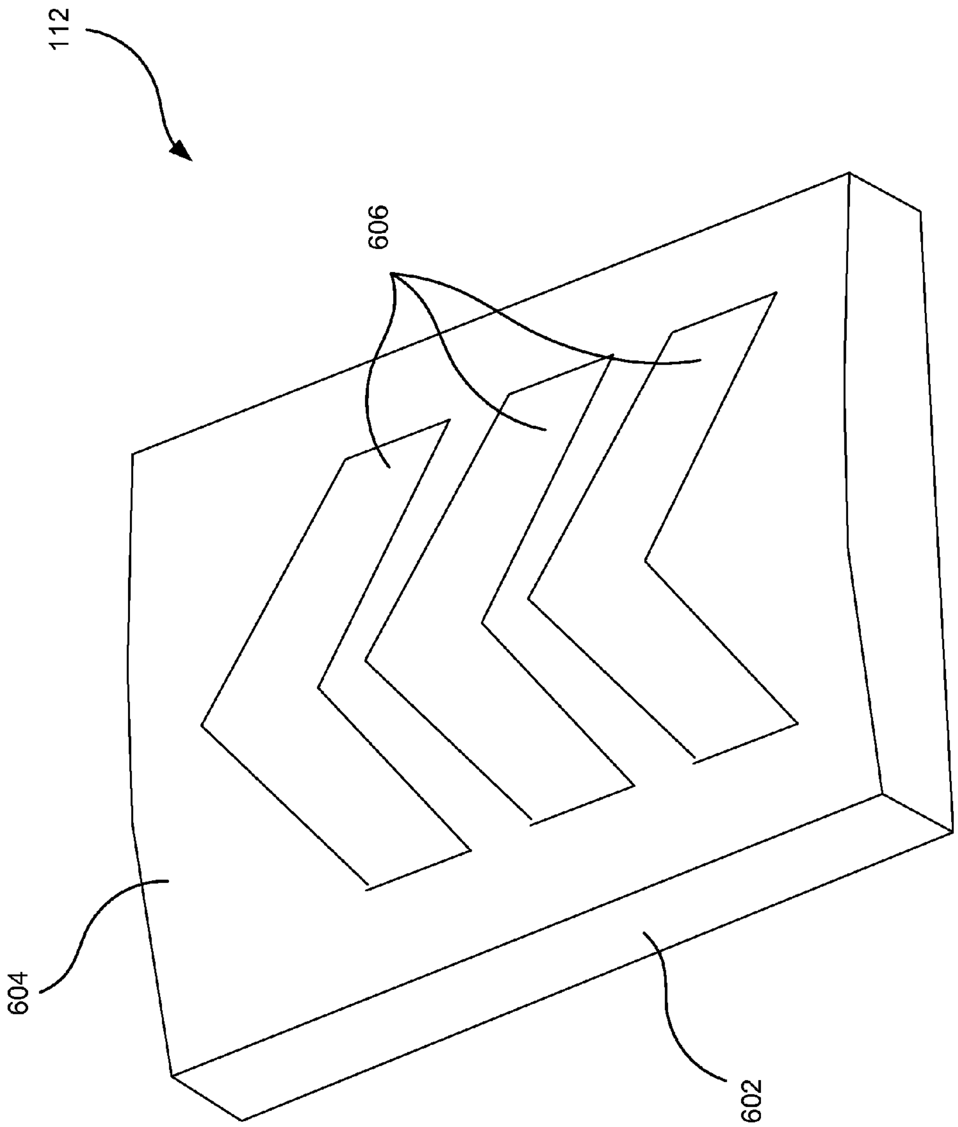
FIG. 6 illustrates an embodiment of a visual warning device.

FIG. 6 illustrates an embodiment of a visual warning device 112. The visual warning device can include a housing 602, faceplate 604, and warning lights 606. The visual warning device 112 can be affixed to a structure 104 such as a garage in a location that is readily visible to a driver entering the structure 104 in the vehicle 102. The visual warning device 112 can be battery powered or connected to an electrical system of the structure 104, such as via a 120 V electrical outlet.

The warning lights 606 can include a transparent or translucent material that is flush with the faceplate 604 and allows light from LEDs or other light sources within the housing 602 to shine through the transparent material. The LEDs can have one or more colors and the transparent material can transmit certain wavelengths in order to give a further level of control over the color of light emitted from the visual warning device 112. The warning lights 606 are illustrated as including three arrow-like shapes pointed upwards, thus reminding the driver about the cargo 108 of FIG. 1 on top of his/her car. However, the warning lights 606 can take other shapes and can include other numbers of shapes. The warning lights 606 can also having different operational patterns. For instance, the warning lights 606 can blink in succession from the bottom to middle to top in order to appear as an arrow moving upward. Alternatively, the warning lights 606 can blink or pulse or operate in according to any number of patterns or algorithms.

In an embodiment, one or more of the functions of the visual warning device 112 can be implemented in hardware, software, firmware, or a combination of the above. For instance, the visual warning device 112 can include circuits and software configured to identify the wireless signal from the wireless transmitter 110, convert the signal to a digital signal and analyze the digital signal, and generate one or more instruction signals to be provided to the warning lights 606 or other circuitry, logic, or software in the visual warning device 112.

Figure 7:
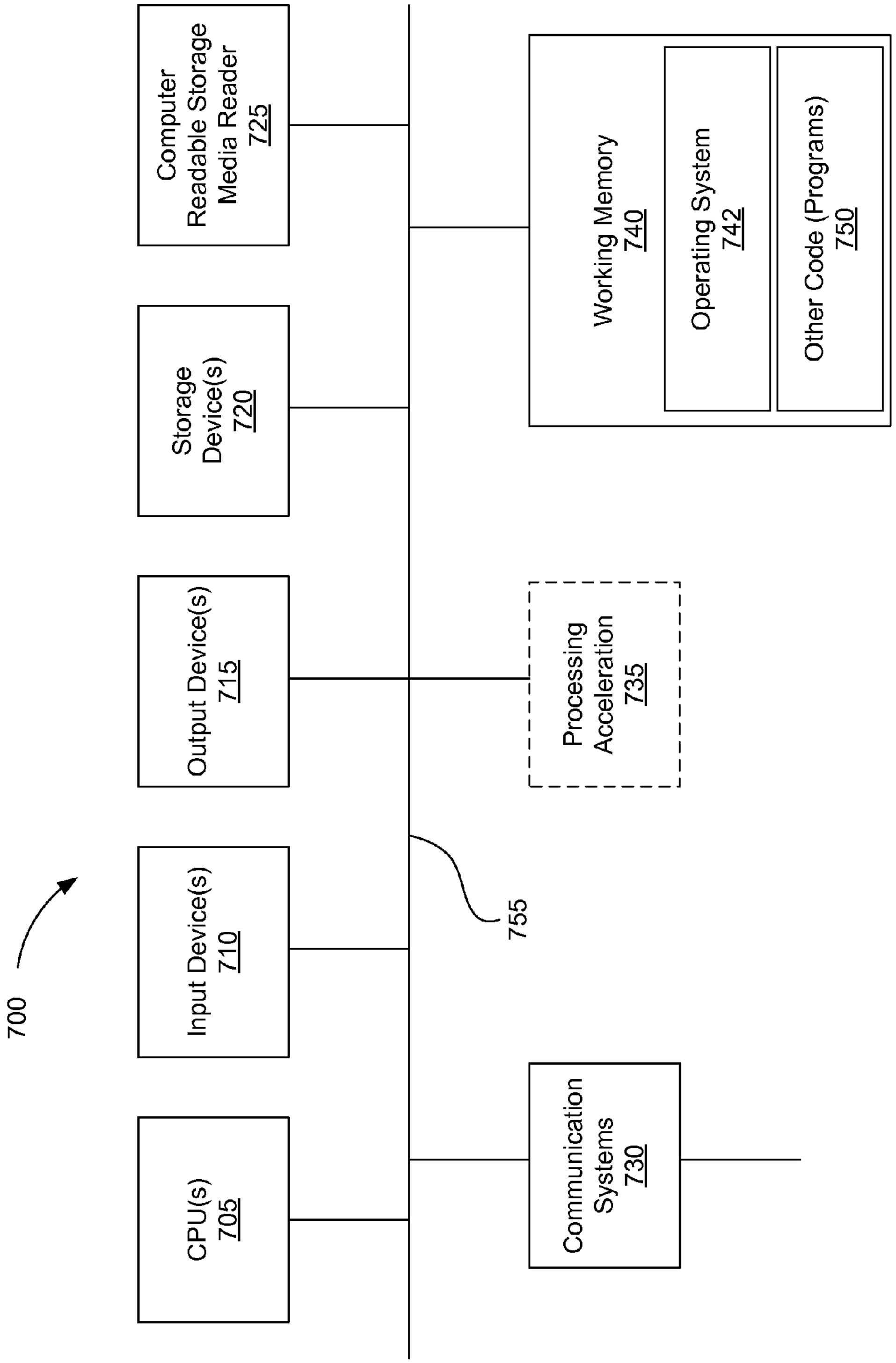
FIG. 7 is a block diagram illustrating an exemplary computer system in which embodiments of the present invention may be implemented.

FIG. 7 is a block diagram illustrating an exemplary computer system 700 in which embodiments of the present invention may be implemented. This example illustrates a computer system 700 such as may be used, in whole, in part, or with various modifications, to provide various components of the systems discussed above. The computer system 700 can be application specific, embedded, or a general purpose computing system.

The computer system 700 is shown comprising hardware elements that may be electrically coupled via a bus 755. The hardware elements may include one or more central processing units (CPUs) 705, one or more input devices 7 (e.g., a mouse, a keyboard, one or more function buttons, etc.), and one or more output devices 715 (e.g., a speaker, LEDs, a display screen, etc.). In a variation, the CPU 705 can be replaced by an application specific integrated circuit (ASIC) or a controller. The computer system 700 may also include one or more storage devices 720. By way of example, storage device(s) 720 may be disk drives, optical storage devices, solid-state storage device such as a random access memory ("RAM") and/or a read-only memory ("ROM"), which can be programmable, flash-updateable and/or the like. The computer system 700 may additionally include a computer readable storage media reader 725, a communications system 730 (e.g., a wireless transmitter, a wireless receiver, a modem, a network card (wireless or wired), a radio-frequency communication device, an infra-red communication device, etc.), and working memory 740, which may include RAM and ROM devices as described above. In some embodiments, the computer system 700 may also include a processing acceleration unit 735, which can include a DSP, a special-purpose processor and/or the like.

The computer-readable storage media reader 725 can further be connected to a computer-readable storage medium, together (and, optionally, in combination with storage device (s) 720) comprehensively representing remote, local, fixed, and/or removable storage devices plus storage media for temporarily and/or more permanently containing computer-readable information. The communications system 730 may permit data to be exchanged with the network 720 and/or any other computer described above with respect to the system 700.

The computer system 700 may also comprise software elements, shown as being currently located within a working memory 740, including an operating system and/or other code 750. It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

Software of computer system 700 may include code 750 for implementing any or all of the function of the various elements of the architecture as described herein. For example, software, stored on and/or executed by a computer system such as system 700, can provide the functions of the service provider system, a manager, an end device, etc. Methods implemented by software on some of these components will be discussed in detail below.

Figure 8:
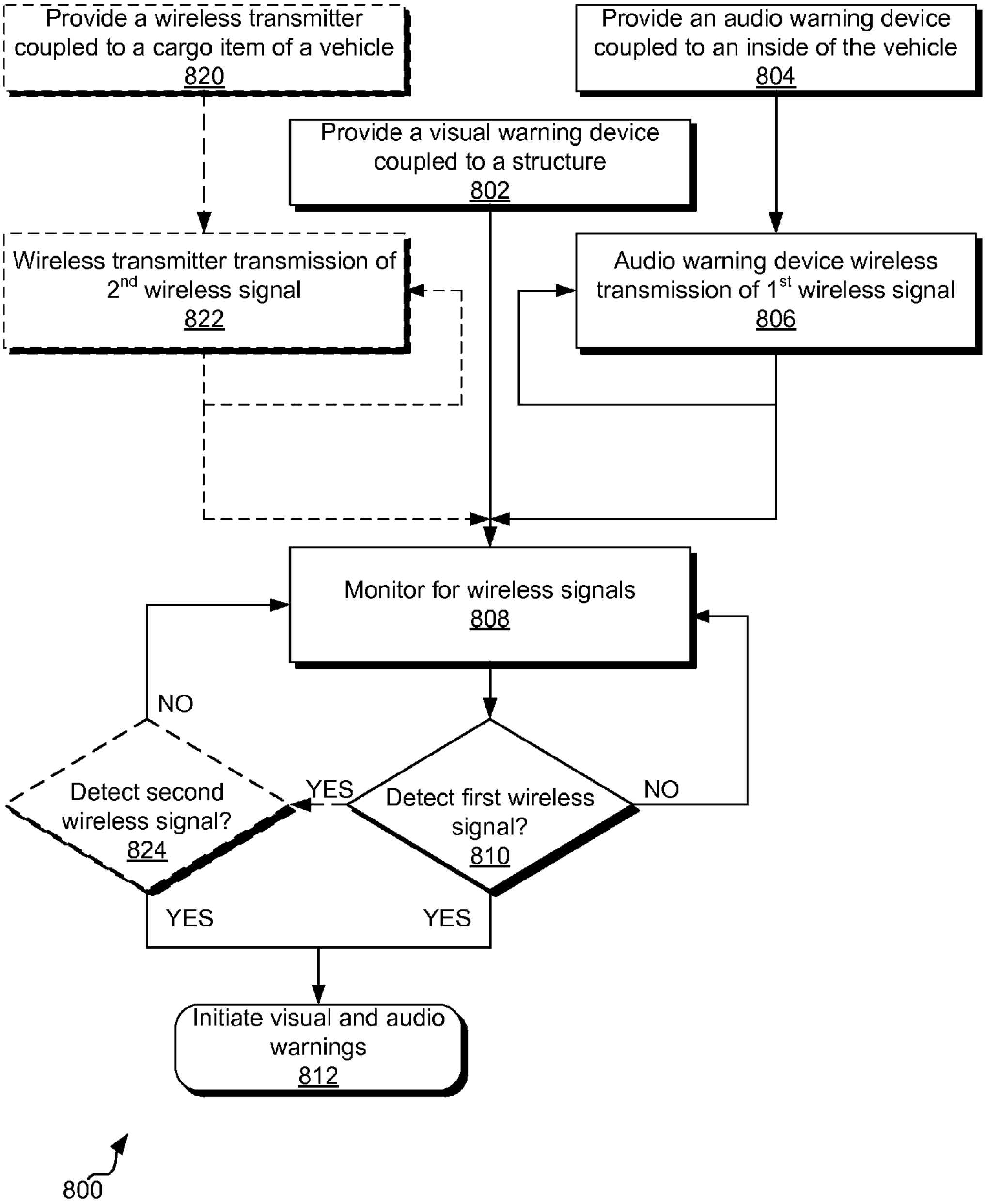
FIG. 8 illustrates a method of warning a driver of a potential collision with vehicle cargo extending above a height of the vehicle.

FIG. 8 illustrates a method 800 of warning a driver of a potential collision between a vehicle or a vehicle's cargo and a structure. The method 800 includes providing a visual warning device (e.g., 112 from FIG. 1 or FIG. 6) coupled to a structure 802 (e.g., a garage, jetway, tunnel entryway, structure 104 from FIG. 1). The visual warning device is configured to monitor for wireless signals, and in particular wireless signals from an audio warning device (e.g., 116 from FIGS. 1 and 116 from FIGS. 4-5). The method 800 further includes providing an audio warning device 804. In one embodiment, the audio warning device can be coupled to an inside of a vehicle (e.g., 102 from FIG. 1). The audio warning device can transmit a first wireless signal in a first wireless transmission operation 806. The visual warning device can then monitor for wireless signals in a monitor operation 808 as the first wireless transmission operation 806 continues to transmit in a continuous or periodic fashion. The visual warning device can monitor for the first wireless signal, in one embodiment. A first decision operation 810 determines if the visual warning device has detected the first wireless signal until the first wireless signal is detected. An initiation operation 812 then initiates a visual warning sequence (e.g., blinking lights) in the visual warning device and an audio warning sequence (e.g., beeping sounds) in the audio warning device.

This embodiment can be applicable, for instance, where there is a desire to prevent damage to a tall vehicle or any vehicle that risks running into a roof, overhang, garage, or any other structure that might impact the vehicle and is difficult to see. For instance, and as seen in the example illustrated in FIG. 10, the method 800 can be used to prevent accidental damage to airport vehicles (e.g., 1002 in FIG. 10) that often drive under or near jetways (e.g., 1004).

The method 800 may optionally also include providing a wireless transmitter 820 (e.g., 110 from FIGS. 1-3) that can be coupled to the vehicle or to a cargo item of the vehicle (e.g., a kayak or bike on the roof). The wireless transmitter can transmit a second wireless signal in an optional second wireless transmission operation 822 and continue transmitting in a continuous or periodic fashion. In this embodiment, the monitor operation 808 can monitor for both the first and second wireless signals. If the first decision 810 determines that the visual warning device detects the first wireless signal, then the method 800 turns to an optional second decision 824, where the optional second decision 824 decides if the visual warning device detects the second wireless signal 824. The first decision 810 loops back to the monitoring operation 808 if the first wireless signal is not detected, and even if it is, the second decision 824 may loop back to the monitoring operation 808 if the second wireless signal is not detected. If the visual warning device detects both the first and second wireless signals, then it is within range of both the audio warning device and the wireless transmitter, and the initiation operation 812 initiates the visual and audio warnings.

Figure 9:
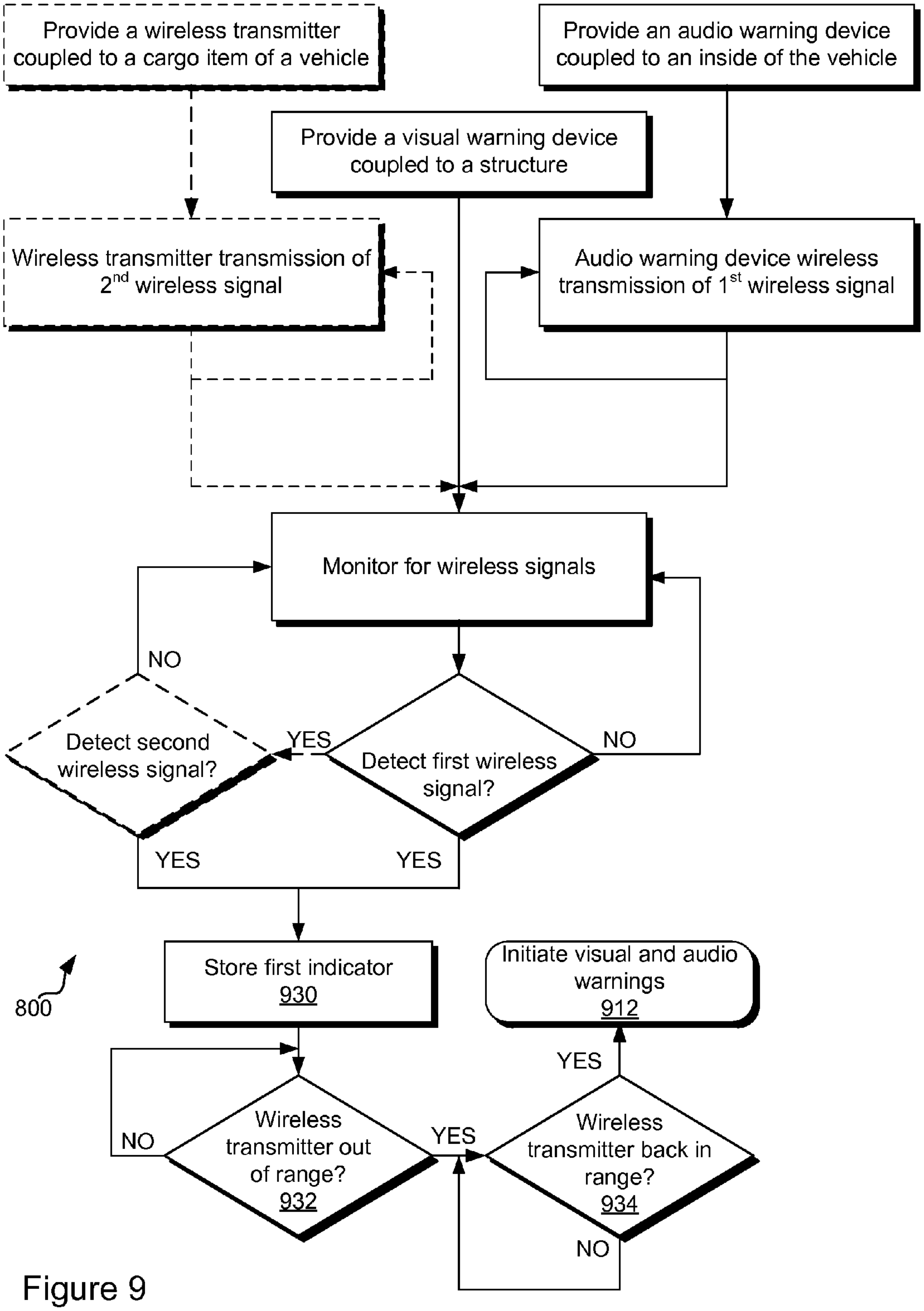
FIG. 9 illustrates another method of warning a driver of a potential collision with vehicle cargo extending above a height of the vehicle.

FIG. 9 illustrates a method 900 of warning a driver of a potential collision between a vehicle or a vehicle's cargo and a structure. Like the method 800, the method 900 generates wireless signals from an audio warning device and optionally a wireless transmitter coupled to the vehicle or a cargo item of the vehicle. Like the method 800, the method 900 also monitors for either or both of these wireless signals, and initiates audio and visible warnings to a driver of the vehicle if either or both of the devices come within range of the visual warning device. However, to prevent false positives the method 900 stores a first indicator in memory when the first wireless signal (or optionally the first and second wireless signals) are detected. When the wireless transmitter moves out of range of the visual warning device, this event is stored in the memory. When the wireless transmitter returns, and the first indicator is in memory, audible and visible warning sequences are initiated.

In particular, when either the first or the first and second wireless signals are detected, a first indicator is stored in a memory of the visual warning device at 930. If the wireless transmitter moves out of range such that the visual warning device can no longer detect the wireless transmitter, as determined via a looping wireless transmitter out of range decision 932, then the method 900 waits until the wireless transmitter renters range. This is monitored via a wireless transmitter at 934, which loops until the wireless transmitter is detected again. Once the wireless transmitter is detected again, an initiate visual and audio warnings operation 912 takes effect as discussed with reference to FIG. 8.

Various algorithms can be used to implement the decisions 932 and 934. For instance, a second indicator can be stored in the memory when the wireless transmitter moves out of range. Upon returning, the initiate visual and audio warnings operation 912 may only initiate where the first and second indicator are already stored in memory. In other words, the warnings only initiate if there is evidence that the given wireless transmitter has been previously within range of the visual warning device. In another example, the initiate visual and audio warnings operation 912 may only perform if both the wireless transmitter and the audio warning device leave and return—if only one returns (e.g., a bike leaves atop a car, but only the bike is ridden home, or only the car is driven home), then the initiate visual and audio warnings operation 912 does not occur. Numerous other algorithms can also be carried out in order to avoid false positives.

Figure 10:
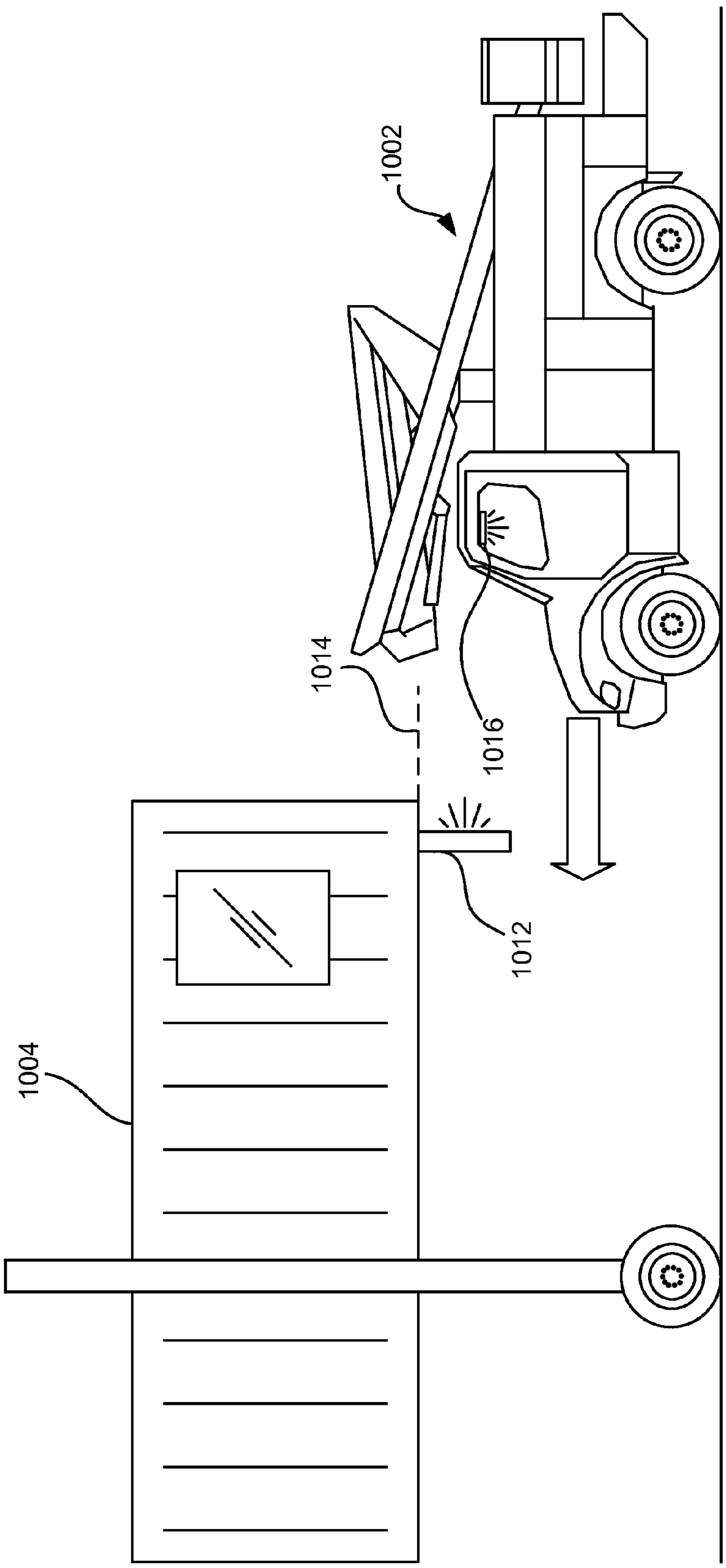
FIG. 10 illustrates a structure and a vehicle incorporating a proximity-based wireless detection system as herein disclosed.

FIG. 10 illustrates a structure and a vehicle incorporating a proximity-based wireless detection system as herein disclosed. A visual warning device 1012 can be coupled to a structure 1004 (e.g., an airport jetway, a parking garage, tall construction equipment, freeway overpasses, fleet vehicle garages, etc.). As illustrated, the visual warning device 1012 is coupled to a bottom of the structure 1004 such that the visual warning device 1012 hangs below an elevation 1014 considered likely to be struck by a portion of a vehicle 1002. However, in other embodiments, the visual warning device 1012 can be coupled to any portion of the structure, with any orientation. Also, there can be more than one visual warning devices 1012 operating in unison or all with different wireless ranges and tailored to vehicles approaching from different directions. The vehicle 1002 is illustrated as a boom truck, but can be embodied by any vehicle, especially those having large appendages or structural features rising above the cab or eye level of the driver. Here, the boom rises above the elevation 1014 at which contact with the structure 1004 will occur if the vehicle 1002 continues to move towards and under the structure 1004.

The vehicle 1002 is equipped with an audio warning device 1016 which generates a wireless signal that can be detected by the visual warning device 1012 when the audio warning device 1016 is within range of the visual warning device 1012. When the audio warning device 1016 is within range of the visual warning device 1012 and is therefore detected by the visual warning device 1012, the visual warning device initiates a visual warning sequence by, for instance, flashing a pattern of lights towards the vehicle 1002, hopefully commanding the driver's attention. At the same time, the visual warning device 1012 can instruct the audio warning device 1016 to initiate an audible warning sequence that may include, for instance, rapid beeping having an increasing pitch, periodicity, and/or volume. Preferably, either or both of the visual or the audible warnings will capture the driver's attention and remind him/her of the danger of driving under the structure 1004.

In conclusion, the present invention provides, among other things, a method, system, and apparatus that provides visual and audio warnings to a vehicle driver warning of cargo on the vehicle roof when the vehicle approaches a structure, and does so without requiring electrical connections to the vehicle and without requiring the driver to remember to attach any devices to the cargo every time that the vehicle is driven. Those skilled in the art can readily recognize that numerous variations and substitutions may be made in the invention, its use, and its configuration to achieve substantially the same results as achieved by the embodiments described herein. Accordingly, there is no intention to limit the invention to the disclosed exemplary forms. Many variations, modifications, and alternative constructions fall within the scope and spirit of the disclosed invention.

What is claimed is:

1. A wireless vehicle warning system comprising:

a wireless transmitter fixed to a vehicle-mounted cargo item;

an audio warning device coupled to the vehicle and configured to provide an audio warning to at least one occupant of the vehicle when a notification is received; and a visual warning device coupled to a structure, the structure external to the vehicle and the cargo item;

wherein, upon detecting a presence of the wireless transmitter, the presence indicative of an approaching movement of the wireless transmitter, the visual warning device is configured to:

provide a first visual warning to the vehicle; and provide the notification to the audio warning device.

2. The wireless vehicle warning system of claim 1, wherein without the audio or visual warnings, continued movement of the vehicle would result in collision between the cargo item and a portion of the structure.

3. The wireless vehicle warning system of claim 1, wherein upon detecting a presence of the wireless transmitter and the audio warning device, the visual warning device is configured to:

provide the first visual warning to the vehicle; and provide the notification to the audio warning device.

4. The wireless vehicle warning system of claim 1, wherein the audio warning device is further configured to provide a second visual warning to the vehicle.

5. The wireless vehicle warning system of claim 1, wherein the cargo item is coupled to a top portion of the vehicle.

6. The wireless vehicle warning system of claim 1, wherein the cargo item is coupled to a rear portion of the vehicle or to a trailer.

7. The wireless vehicle warning system of claim 1, wherein the visual warning device includes a memory for storing a first indicator of the wireless transmitter's presence.

8. The wireless vehicle warning system of claim 7, wherein the visual warning device stores the first indicator of the wireless transmitter's presence in the memory when the visual warning device detects the wireless transmitter and the audio warning device.

9. The wireless vehicle warning system of claim 7, wherein the memory is configured to store a second indicator when:

the first indicator is in the memory; and the visual warning device ceases to detect the wireless transmitter.

10. The wireless vehicle warning system of claim 9, wherein the memory is configured to store a second indicator when a predetermined period of time has elapsed since the visual warning device ceases to detect the wireless transmitter.

11. The wireless vehicle warning system of claim 9, wherein the memory is configured to store the second indicator when:

the first indicator is in the memory;

the visual warning device ceases to detect the wireless transmitter; and the visual warning device ceases to detect the audio warning device.

12. The wireless vehicle warning system of claim 10, wherein upon detecting a presence of the wireless transmitter, and if the second indicator is in the memory, the visual warning device is configured to:

provide the first visual warning to the vehicle; and provide the notification to the audio warning device.

13. The wireless vehicle warning system of claim 1, wherein the visual warning device detects the wireless transmitter and the audio warning device when they come within a detection range of the visual warning device.

14. The wireless vehicle warning system of claim 1, wherein the wireless transmitter is configured to transmit but not receive.

15. A method of preventing damage to a vehicle or its cargo comprising:

providing an audio warning device coupled to the vehicle;

providing a visual warning device coupled to a structure, the structure external to the vehicle and the cargo item;

transmitting a first wireless signal from the audio warning device to the visual warning device;

providing a wireless transmitter coupled to a cargo item coupled to the vehicle; and transmitting a second wireless signal from the wireless transmitter to the visual warning device; and initiating a visual warning sequence in the visual warning device and an audio warning sequence in the audio warning device when the visual warning device detects the first wireless signal and the second wireless signal.

16. The method of claim 15, further comprising initiating the visual warning sequence in the visual warning device and the audio warning sequence in the audio warning device when the first and second wireless signals are detected.

17. A wireless vehicle warning system comprising:

an audio warning device coupled to the vehicle and configured to provide an audio warning to at least one occupant of the vehicle when a notification is received;

a wireless transmitter coupled to a cargo item coupled to the vehicle, the wireless transmitter configured to provide a signal to the visual warning device; and a visual warning device remote from the vehicle that upon detecting a presence of the audio warning device and the wireless transmitter, is configured to:

provide a visual warning to the vehicle; and provide the notification to the audio warning device.

* * * * *